(12) United States Patent
Bodtker

(10) Patent No.: US 10,160,473 B2
(45) Date of Patent: Dec. 25, 2018

(54) STEERING COLUMN DECOUPLING SYSTEM

(71) Applicant: STEERING SOLUTIONS IP HOLDING CORPORATION, Saginaw, MI (US)

(72) Inventor: Joen C. Bodtker, Gaines, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 162 days.

(21) Appl. No.: 15/264,130

(22) Filed: Sep. 13, 2016

(65) Prior Publication Data

US 2018/0072339 A1    Mar. 15, 2018

(51) Int. Cl.
*B62D 1/183*    (2006.01)
*B62D 5/00*    (2006.01)
*B62D 5/04*    (2006.01)

(52) U.S. Cl.
CPC ............. *B62D 1/183* (2013.01); *B62D 5/001* (2013.01); *B62D 5/0454* (2013.01)

(58) Field of Classification Search
CPC ............................ B62D 1/183; B62D 5/0454
USPC ........................................................ 180/444
See application file for complete search history.

(56) References Cited

U.S. PATENT DOCUMENTS

| | | |
|---|---|---|
| 1,795,566 A | 3/1931 | Maccomb |
| 1,944,905 A | 1/1934 | Rowell |
| 2,465,825 A | 3/1949 | Tucker |
| 2,622,690 A | 12/1952 | Barenyi |
| 3,734,051 A | 5/1973 | Dahl |
| 3,910,597 A | 10/1975 | Seko |
| 4,013,034 A | 3/1977 | Cantley et al. |
| 4,315,117 A | 2/1982 | Kokubo et al. |
| 4,337,967 A | 7/1982 | Yoshida et al. |
| 4,368,454 A | 1/1983 | Pilatzki |
| 4,429,588 A | 2/1984 | Emundts et al. |
| 4,485,371 A | 11/1984 | Yamada et al. |

(Continued)

FOREIGN PATENT DOCUMENTS

| | | |
|---|---|---|
| CA | 1318833 C | 6/1993 |
| CN | 1722030 A | 1/2006 |

(Continued)

OTHER PUBLICATIONS

China Patent Application No. 201510204221.5 Second Office Action dated Mar. 10, 2017, 8 pages.

(Continued)

*Primary Examiner* — Kevin Hurley
*Assistant Examiner* — Felicia L. Brittman
(74) *Attorney, Agent, or Firm* — Cantor Colburn LLP

(57) ABSTRACT

A steering column decoupling system includes a steering shaft. Also included is an intermediate shaft. Further included is a driving disk operatively coupled to the steering shaft and rotatable therewith. Yet further included is a driven disk operatively coupled to the intermediate shaft and rotatable therewith, the driven disk disposed adjacent the driving disk. Also included is a slot defined by the driven disk. Further included is a coupling element coupled to the driving disk and disposed within the slot, the driven disk moveable relative to the coupling element between a column coupled position and a column decoupled position.

18 Claims, 2 Drawing Sheets

(56) References Cited

U.S. PATENT DOCUMENTS

| | | | |
|---|---|---|---|
| 4,503,300 A | 3/1985 | Lane, Jr. |
| 4,503,504 A | 3/1985 | Suzumura et al. |
| 4,561,323 A | 12/1985 | Stromberg |
| 4,603,599 A | 8/1986 | Matsuoka |
| 4,625,578 A | 12/1986 | Nishijima |
| 4,635,029 A | 1/1987 | Yamada |
| 4,638,287 A | 1/1987 | Umebayashi |
| 4,674,352 A | 6/1987 | Mizuno et al. |
| 4,691,587 A | 9/1987 | Farrand et al. |
| 4,715,463 A | 12/1987 | Shimizu |
| 4,766,326 A | 8/1988 | Hayashi et al. |
| 4,771,650 A | 9/1988 | Kerner |
| 4,771,846 A | 9/1988 | Venable et al. |
| 4,825,972 A | 5/1989 | Shimizu |
| 4,836,566 A | 6/1989 | Birsching |
| 4,921,066 A | 5/1990 | Conley |
| 4,962,570 A | 10/1990 | Hosaka et al. |
| 4,967,618 A | 11/1990 | Matsumoto et al. |
| 4,976,239 A | 12/1990 | Hosaka |
| 5,072,628 A | 12/1991 | Oki |
| 5,240,284 A | 8/1993 | Takada et al. |
| 5,295,712 A | 3/1994 | Dmura |
| 5,319,803 A | 6/1994 | Allen |
| 5,347,458 A | 9/1994 | Serizawa et al. |
| 5,465,632 A | 11/1995 | Oki et al. |
| 5,488,555 A | 1/1996 | Asgari |
| 5,618,058 A | 4/1997 | Byon |
| 5,668,721 A | 9/1997 | Chandy |
| 5,690,362 A | 11/1997 | Peitsmeier et al. |
| 5,765,116 A | 6/1998 | Wilson-Jones et al. |
| 5,835,870 A | 11/1998 | Kagawa |
| 5,893,580 A | 4/1999 | Hoagland et al. |
| 5,911,789 A | 6/1999 | Keipert et al. |
| 6,070,686 A | 6/2000 | Pollmann |
| 6,109,651 A | 8/2000 | Frisch |
| 6,142,504 A | 11/2000 | Papandreou |
| 6,145,402 A | 11/2000 | Nishitani et al. |
| 6,170,862 B1 | 1/2001 | Hoagland et al. |
| 6,176,341 B1 | 1/2001 | Ansari |
| 6,227,571 B1 | 5/2001 | Sheng et al. |
| 6,301,534 B1 | 10/2001 | McDermott, Jr. |
| 6,354,622 B1 | 3/2002 | Ulbrich et al. |
| 6,360,149 B1 | 3/2002 | Kwon et al. |
| 6,373,472 B1 | 4/2002 | Palalau et al. |
| 6,381,526 B1 | 4/2002 | Higashi et al. |
| 6,390,505 B1 | 5/2002 | Wilson |
| 6,394,218 B1 | 5/2002 | Heitzer |
| 6,419,043 B1 | 7/2002 | Duval et al. |
| 6,488,115 B1 | 12/2002 | Ozsoylu et al. |
| 6,548,969 B2 | 4/2003 | Ewbank et al. |
| 6,578,449 B1 | 6/2003 | Anspaugh et al. |
| 6,588,540 B2 | 7/2003 | Graber et al. |
| 6,612,393 B2 | 9/2003 | Bohner et al. |
| 6,644,432 B1 | 11/2003 | Yost et al. |
| 6,819,990 B2 | 11/2004 | Ichinose |
| 6,955,623 B2 | 10/2005 | Pattok |
| 7,021,416 B2 | 4/2006 | Kapaan et al. |
| 7,048,305 B2 | 5/2006 | Muller |
| 7,062,365 B1 | 6/2006 | Fei |
| 7,295,904 B2 | 11/2007 | Kanevsky et al. |
| 7,308,964 B2 | 12/2007 | Hara et al. |
| 7,380,828 B2 | 6/2008 | Menjak et al. |
| 7,428,944 B2 | 9/2008 | Gerum |
| 7,461,863 B2 | 12/2008 | Muller |
| 7,495,584 B1 | 2/2009 | Sorensen |
| 7,628,244 B2 | 12/2009 | Chino et al. |
| 7,665,572 B2 | 2/2010 | Yamanaka et al. |
| 7,690,685 B2 | 4/2010 | Sasaoka |
| 7,719,431 B2 | 5/2010 | Bolourchi |
| 7,735,405 B2 | 6/2010 | Parks |
| 7,793,980 B2 | 9/2010 | Fong |
| 7,862,079 B2 | 1/2011 | Fukawatase et al. |
| 7,878,294 B2 | 2/2011 | Morikawa |
| 7,894,951 B2 | 2/2011 | Norris et al. |
| 7,909,361 B2 | 3/2011 | Oblizajek et al. |
| 7,931,296 B2 | 4/2011 | Choi |
| 8,002,075 B2 | 8/2011 | Markfort |
| 8,027,767 B2 | 9/2011 | Klein et al. |
| 8,055,409 B2 | 11/2011 | Tsuchiya |
| 8,069,745 B2 | 12/2011 | Strieter et al. |
| 8,079,312 B2 | 12/2011 | Long |
| 8,146,945 B2 | 4/2012 | Born et al. |
| 8,170,725 B2 | 5/2012 | Chin et al. |
| 8,220,355 B2* | 7/2012 | Rouleau ............... B62D 1/187 |
| | | | 74/493 |
| 8,260,482 B1 | 9/2012 | Szybalski et al. |
| 8,352,110 B1 | 1/2013 | Szybalski et al. |
| 8,479,605 B2 | 7/2013 | Shavrnoch et al. |
| 8,548,667 B2 | 10/2013 | Kaufmann |
| 8,606,455 B2 | 12/2013 | Boehringer et al. |
| 8,634,980 B1 | 1/2014 | Urmson et al. |
| 8,650,982 B2 | 2/2014 | Matsuno et al. |
| 8,670,891 B1 | 3/2014 | Szybalski et al. |
| 8,695,750 B1 | 4/2014 | Hammond et al. |
| 8,818,608 B2 | 8/2014 | Cullinane et al. |
| 8,825,258 B2 | 9/2014 | Cullinane et al. |
| 8,825,261 B1 | 9/2014 | Szybalski et al. |
| 8,843,268 B2 | 9/2014 | Lathrop et al. |
| 8,874,301 B1 | 10/2014 | Rao et al. |
| 8,880,287 B2 | 11/2014 | Lee et al. |
| 8,881,861 B2 | 11/2014 | Tojo |
| 8,899,623 B2 | 12/2014 | Stadler et al. |
| 8,909,428 B1 | 12/2014 | Lombrozo |
| 8,948,993 B2 | 2/2015 | Schulman et al. |
| 8,950,543 B2 | 2/2015 | Heo et al. |
| 8,994,521 B2 | 3/2015 | Gazit |
| 9,002,563 B2 | 4/2015 | Green et al. |
| 9,031,729 B2 | 5/2015 | Lathrop et al. |
| 9,032,835 B2 | 5/2015 | Davies et al. |
| 9,045,078 B2 | 6/2015 | Tovar et al. |
| 9,073,574 B2 | 7/2015 | Cuddihy et al. |
| 9,092,093 B2 | 7/2015 | Jubner et al. |
| 9,108,584 B2 | 8/2015 | Rao et al. |
| 9,114,827 B2 | 8/2015 | Burns, Jr. |
| 9,134,729 B1 | 9/2015 | Szybalski et al. |
| 9,150,200 B2 | 10/2015 | Urhahne |
| 9,150,224 B2 | 10/2015 | Yopp |
| 9,164,619 B2 | 10/2015 | Goodlein |
| 9,174,642 B2 | 11/2015 | Wimmer et al. |
| 9,186,994 B2 | 11/2015 | Okuyama et al. |
| 9,193,375 B2 | 11/2015 | Schramm et al. |
| 9,199,553 B2 | 12/2015 | Cuddihy et al. |
| 9,227,531 B2 | 1/2016 | Cuddihy et al. |
| 9,233,638 B2 | 1/2016 | Lisseman et al. |
| 9,235,111 B2 | 1/2016 | Davidsson et al. |
| 9,235,211 B2 | 1/2016 | Davidsson et al. |
| 9,235,987 B2 | 1/2016 | Green et al. |
| 9,238,409 B2 | 1/2016 | Lathrop et al. |
| 9,248,743 B2 | 2/2016 | Enthaler et al. |
| 9,260,130 B2 | 2/2016 | Mizuno |
| 9,290,174 B1 | 3/2016 | Zagorski |
| 9,290,201 B1 | 3/2016 | Lombrozo |
| 9,298,184 B2 | 3/2016 | Bartels et al. |
| 9,308,857 B2 | 4/2016 | Lisseman et al. |
| 9,308,891 B2 | 4/2016 | Cudak et al. |
| 9,333,983 B2 | 5/2016 | Lathrop et al. |
| 9,352,752 B2 | 5/2016 | Cullinane et al. |
| 9,360,865 B2 | 6/2016 | Yopp |
| 9,845,106 B2* | 12/2017 | Bodtker ............... B62D 1/16 |
| 9,852,752 B1 | 12/2017 | Chou et al. |
| 2002/0121153 A1 | 9/2002 | Hoblingre |
| 2002/0189888 A1 | 12/2002 | Magnus et al. |
| 2003/0046012 A1 | 3/2003 | Yamaguchi |
| 2003/0094330 A1 | 5/2003 | Boloorchi et al. |
| 2003/0127276 A1 | 7/2003 | Shimizu et al. |
| 2003/0146037 A1 | 8/2003 | Menjak et al. |
| 2003/0164060 A1 | 9/2003 | Menjak |
| 2003/0188918 A1 | 10/2003 | Shimizu et al. |
| 2003/0192734 A1 | 10/2003 | Bugosh |
| 2003/0227159 A1 | 12/2003 | Muller |
| 2004/0016588 A1 | 1/2004 | Vitale et al. |
| 2004/0046346 A1 | 3/2004 | Eki et al. |
| 2004/0099468 A1 | 5/2004 | Chernoff et al. |
| 2004/0129098 A1 | 7/2004 | Gayer et al. |

(56) References Cited

U.S. PATENT DOCUMENTS

| | | |
|---|---|---|
| 2004/0168848 A1 | 9/2004 | Bohner et al. |
| 2004/0204808 A1 | 10/2004 | Satoh et al. |
| 2004/0262063 A1 | 12/2004 | Kaufmann et al. |
| 2005/0001445 A1 | 1/2005 | Ercolano |
| 2005/0081675 A1 | 4/2005 | Oshita et al. |
| 2005/0197746 A1 | 9/2005 | Pelchen et al. |
| 2005/0275205 A1 | 12/2005 | Ahnafield |
| 2006/0202462 A1 | 9/2006 | Menjak et al. |
| 2006/0224287 A1 | 10/2006 | Izawa et al. |
| 2006/0244251 A1 | 11/2006 | Muller |
| 2007/0021889 A1 | 1/2007 | Tsuchiya |
| 2007/0029771 A1 | 2/2007 | Haglund et al. |
| 2007/0046003 A1 | 3/2007 | Mori et al. |
| 2007/0046013 A1 | 3/2007 | Bito |
| 2007/0241548 A1 | 10/2007 | Fong |
| 2007/0284867 A1 | 12/2007 | Cymbal et al. |
| 2008/0009986 A1 | 1/2008 | Lu et al. |
| 2008/0238068 A1 | 10/2008 | Kumar et al. |
| 2008/0277178 A1 | 11/2008 | Poli et al. |
| 2009/0024278 A1 | 1/2009 | Kondo et al. |
| 2009/0256342 A1 | 10/2009 | Cymbal et al. |
| 2009/0276111 A1 | 11/2009 | Wang et al. |
| 2009/0292466 A1 | 11/2009 | Mccarthy et al. |
| 2010/0152952 A1 | 6/2010 | Lee et al. |
| 2010/0222976 A1 | 9/2010 | Haug |
| 2010/0228417 A1 | 9/2010 | Lee et al. |
| 2010/0228438 A1 | 9/2010 | Buerkle |
| 2010/0280713 A1 | 11/2010 | Stahlin et al. |
| 2010/0286869 A1 | 11/2010 | Katch et al. |
| 2010/0288567 A1 | 11/2010 | Bonne |
| 2011/0029200 A1 | 2/2011 | Shah |
| 2011/0098922 A1 | 4/2011 | Ibrahim |
| 2011/0153160 A1 | 6/2011 | Hesseling et al. |
| 2011/0167940 A1 | 7/2011 | Shavrnoch et al. |
| 2011/0187518 A1 | 8/2011 | Strumolo et al. |
| 2011/0266396 A1 | 11/2011 | Abildgaard et al. |
| 2011/0282550 A1 | 11/2011 | Tada et al. |
| 2012/0136540 A1 | 5/2012 | Miller |
| 2012/0205183 A1 | 8/2012 | Rombold |
| 2012/0209473 A1 | 8/2012 | Birsching et al. |
| 2012/0215377 A1 | 8/2012 | Takemura et al. |
| 2013/0002416 A1 | 1/2013 | Gazit |
| 2013/0087006 A1 | 4/2013 | Ohtsubo et al. |
| 2013/0158771 A1 | 6/2013 | Kaufmann |
| 2013/0218396 A1 | 8/2013 | Moshchuk et al. |
| 2013/0233117 A1 | 9/2013 | Read et al. |
| 2013/0292955 A1 | 11/2013 | Higgins et al. |
| 2013/0319163 A1 | 12/2013 | Davies et al. |
| 2013/0325202 A1 | 12/2013 | Howard et al. |
| 2014/0028008 A1 | 1/2014 | Stadler et al. |
| 2014/0046542 A1 | 2/2014 | Kauffman et al. |
| 2014/0046547 A1 | 2/2014 | Kauffman et al. |
| 2014/0111324 A1 | 4/2014 | Lisseman et al. |
| 2014/0136055 A1 | 5/2014 | Sugiyama |
| 2014/0277896 A1 | 9/2014 | Lathrop et al. |
| 2014/0300479 A1 | 10/2014 | Wolter et al. |
| 2014/0309816 A1 | 10/2014 | Stefan et al. |
| 2015/0002404 A1 | 1/2015 | Hooton |
| 2015/0014086 A1 | 1/2015 | Eisenbarth |
| 2015/0032322 A1 | 1/2015 | Wimmer |
| 2015/0051780 A1 | 2/2015 | Hahne |
| 2015/0060185 A1 | 3/2015 | Feguri |
| 2015/0088357 A1 | 3/2015 | Yopp |
| 2015/0120142 A1 | 4/2015 | Park et al. |
| 2015/0210273 A1 | 7/2015 | Kaufmann et al. |
| 2015/0246673 A1 | 9/2015 | Tseng et al. |
| 2015/0251666 A1 | 9/2015 | Attard et al. |
| 2015/0283998 A1 | 10/2015 | Lind et al. |
| 2015/0324111 A1 | 11/2015 | Jubner et al. |
| 2016/0009311 A1 | 1/2016 | Khale et al. |
| 2016/0009332 A1 | 1/2016 | Sirbu |
| 2016/0075371 A1 | 3/2016 | Varunkikar et al. |
| 2016/0082867 A1 | 3/2016 | Sugioka et al. |
| 2016/0185387 A1 | 6/2016 | Kuoch |
| 2016/0200246 A1 | 7/2016 | Lisseman et al. |
| 2016/0200343 A1 | 7/2016 | Lisseman et al. |
| 2016/0200344 A1 | 7/2016 | Sugioka et al. |
| 2016/0207538 A1 | 7/2016 | Urano et al. |
| 2016/0209841 A1 | 7/2016 | Yamaoka et al. |
| 2016/0229450 A1 | 8/2016 | Basting et al. |
| 2016/0231743 A1 | 8/2016 | Bendewald et al. |
| 2016/0304123 A1 | 10/2016 | Lewis et al. |
| 2016/0318540 A1 | 11/2016 | King |
| 2016/0318542 A1 | 11/2016 | Pattok et al. |
| 2016/0347347 A1 | 12/2016 | Lubischer |
| 2016/0347348 A1 | 12/2016 | Lubischer |
| 2016/0362084 A1 | 12/2016 | Martin et al. |
| 2016/0362117 A1 | 12/2016 | Kaufmann et al. |
| 2016/0362126 A1 | 12/2016 | Lubischer |
| 2016/0368522 A1 | 12/2016 | Lubischer |
| 2016/0375860 A1 | 12/2016 | Lubischer |
| 2016/0375923 A1 | 12/2016 | Schulz |
| 2016/0375925 A1 | 12/2016 | Lubischer et al. |
| 2016/0375926 A1 | 12/2016 | Lubischer et al. |
| 2016/0375927 A1 | 12/2016 | Schulz et al. |
| 2016/0375928 A1 | 12/2016 | Magnus |
| 2016/0375929 A1 | 12/2016 | Rouleau |
| 2016/0375931 A1 | 12/2016 | Lubischer |
| 2017/0029009 A1 | 2/2017 | Rouleau |
| 2017/0029018 A1 | 2/2017 | Lubischer |
| 2017/0057541 A1 | 3/2017 | Bodtker et al. |
| 2017/0106894 A1 | 4/2017 | Bodtker |
| 2017/0113712 A1 | 4/2017 | Watz |
| 2018/0079442 A1 | 3/2018 | Lubischer et al. |

FOREIGN PATENT DOCUMENTS

| | | |
|---|---|---|
| CN | 1736786 A | 2/2006 |
| CN | 101037117 A | 9/2007 |
| CN | 101041355 A | 9/2007 |
| CN | 101108629 A | 1/2008 |
| CN | 101213124 A | 7/2008 |
| CN | 101341345 A | 1/2009 |
| CN | 101596903 A | 12/2009 |
| CN | 101674965 A | 3/2010 |
| CN | 101758855 A | 6/2010 |
| CN | 102452391 A | 5/2012 |
| CN | 103359151 A | 10/2013 |
| CN | 103419840 A2 | 12/2013 |
| CN | 103448785 A | 12/2013 |
| CN | 203460923 U | 3/2014 |
| CN | 104044629 A | 9/2014 |
| CN | 104512458 A | 4/2015 |
| CN | 104602989 A | 5/2015 |
| DE | 19523214 A1 | 1/1997 |
| DE | 19625503 C1 | 9/1997 |
| DE | 19923012 A1 | 11/2000 |
| DE | 10036281 A1 | 7/2002 |
| DE | 10212782 A1 | 10/2003 |
| DE | 102005032528 A1 | 1/2007 |
| DE | 102005056438 A1 | 6/2007 |
| DE | 102006025254 A1 | 12/2007 |
| DE | 102010025197 A1 | 12/2011 |
| EP | 0931711 A1 | 7/1999 |
| EP | 1559630 A2 | 8/2005 |
| EP | 1783719 A2 | 5/2007 |
| EP | 1932745 A2 | 6/2008 |
| EP | 1990244 A1 | 11/2008 |
| EP | 2384946 A2 | 11/2011 |
| EP | 2426030 A1 | 3/2012 |
| EP | 2489577 A2 | 8/2012 |
| EP | 2604487 A1 | 6/2013 |
| EP | 1606149 B1 | 5/2014 |
| FR | 2862595 A1 | 5/2005 |
| FR | 3016327 A1 | 7/2015 |
| JP | S60157963 | 8/1985 |
| JP | S6343846 A | 2/1988 |
| JP | H05162652 A | 6/1993 |
| JP | 2000355278 A | 12/2000 |
| JP | 2004009989 A | 1/2004 |
| JP | 2004009989 A * | 1/2004 |
| JP | 2007253809 A | 10/2007 |
| KR | 20100063433 A | 6/2010 |
| WO | 2006099483 A1 | 9/2006 |

(56) References Cited

FOREIGN PATENT DOCUMENTS

| WO | 2010082394 | A1 | 7/2010 |
|---|---|---|---|
| WO | 2010116518 | A1 | 10/2010 |
| WO | 2015049231 | A1 | 4/2015 |

OTHER PUBLICATIONS

CN Patent Application No. 201210599006.6 First Office Action dated Jan. 27, 2015, 9 pages.
CN Patent Application No. 201210599006.6 Second Office Action dated Aug. 5, 2015, 5 pages.
CN Patent Application No. 201310178012.9 First Office Action dated Apr. 13, 2015, 13 pages.
CN Patent Application No. 201310178012.9 Second Office Action dated Dec. 28, 2015, 11 pages.
CN Patent Application No. 201410089167 First Office Action and Search Report dated Feb. 3, 2016, 9 pages.
EP Application No. 14156903.8 Extended European Search Report, dated Jan. 27, 2015, 10 pages.
EP Application No. 14156903.8 Office Action dated Nov. 16, 2015, 4 pages.
EP Application No. 14156903.8 Office Action dated May 31, 2016, 5 pages.
EP Application No. 14156903.8 Partial European Search Report dated Sep. 23, 2014, 6 pages.
EP Application No. 15152834.6 Extended European Search Report dated Oct. 8, 2015, 7 pages.
European Application No. 12196665.9 Extended European Search Report dated Mar. 6, 2013, 7 pages.
European Search Report for European Application No. 13159950.8; dated Jun. 6, 2013; 7 pages.
Gillespie, Thomas D.; "Fundamentals of Vehicle Dynamics"; Society of Automotive Enginers, Inc.; published 1992; 294 pages.
Kichun, et al.; "Development of Autonomous Car-Part II: A Case Study on the Implementation of an Autonomous Driving System Based on Distributed Architecture"; IEEE Transactions on Industrial Electronics, vol. 62, No. 8, Aug. 2015; 14 pages.
Office Action regarding CN App. No. 201510204221.5; dated Aug. 29, 2016; 6 pgs.
Partial European Search Report for related European Patent Application No. 141569018, dated Sep. 23, 2014, 6 pages.
Van der Jagt, Pim; "Prediction of Steering Efforts During Stationary or Slow Rolling Parking Maneuvers"; Ford Forschungszentrum Aachen GmbH.; Oct. 27, 1999; 20 pages.
Varunjikar, Tejas; Design of Horizontal Curves With DownGrades Using Low-Order Vehicle Dynamics Models; A Theisis by T. Varunkikar; 2011; 141 pages.

* cited by examiner

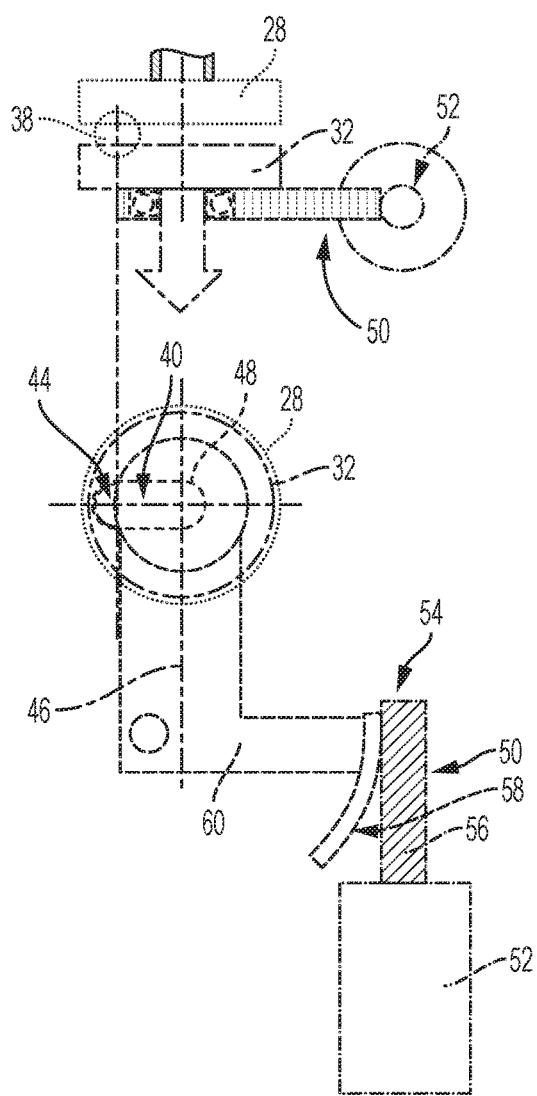
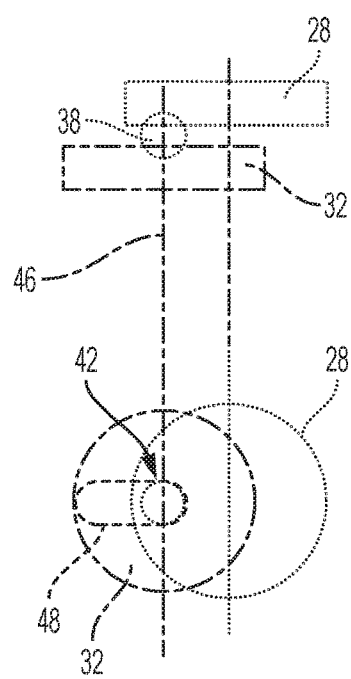
FIG. 2
FIG. 3

STEERING COLUMN DECOUPLING SYSTEM

BACKGROUND

The embodiments described herein relate to vehicle steering systems and, more particularly, to a steering column decoupling system.

It is desirable to switch between a mechanically coupled and decoupled steering column in vehicle steering systems. For example, vehicles equipped with advanced driver assist steering (ADAS) systems may allow a steering column and steering wheel assembly to be retracted to a stowed position to enable the driver to engage in non-steering activities such as reading, working, etc. When the steering wheel is stowed, it may be desirable to have the wheel in a non-rotatable condition. This enables the vehicle to be steered by the ADAS system with a decoupled steering shaft. However, automated transitioning between a coupled and decoupled steering column is challenging.

SUMMARY

According to one aspect of the disclosure, a steering column decoupling system includes a steering shaft. Also included is an intermediate shaft. Further included is a driving disk operatively coupled to the steering shaft and rotatable therewith. Yet further included is a driven disk operatively coupled to the intermediate shaft and rotatable therewith, the driven disk disposed adjacent the driving disk. Also included is a slot defined by the driven disk. Further included is a coupling element coupled to the driving disk and disposed within the slot, the driven disk moveable relative to the coupling element between a column coupled position and a column decoupled position.

According to another aspect of the disclosure, a steering column decoupling system includes a steering shaft. Also included is an intermediate shaft. Further included is a driving disk operatively coupled to the steering shaft and rotatable therewith. Yet further included is a driven disk operatively coupled to the intermediate shaft and rotatable therewith. Also included is a receiving element of the driven disk. Further included is a coupling element coupled to the driving disk and disposed within the receiving element of the driven disk, the driving disk and the driven disk moveable relative to each other. Yet further included is an actuation mechanism engageable with the driven disk to move the driven disk between a column coupled position and a column decoupled position. The actuation mechanism includes a motor. The actuation mechanism also includes a worm actuator driven by the motor. The actuation mechanism further includes a pivotable engagement crank driven by the worm actuator.

According to yet another aspect of the disclosure, an advanced driving assist steering (ADAS) system includes a steering shaft. Also included is an intermediate shaft. Further included is a driving disk operatively coupled to the steering shaft and rotatable therewith. Yet further included is a driven disk operatively coupled to the intermediate shaft and rotatable therewith, the driven disk disposed adjacent the driving disk. Also included is a slot defined by the driven disk. Further included is a coupling element coupled to the driving disk and disposed within the slot, the driven disk moveable relative to the coupling element between a column coupled position and a column decoupled position, the driven disk is in the column coupled position in a non-ADAS driving mode, the driven disk in the column decoupled position in an ADAS driving mode. Yet further included is an actuation mechanism engageable with the driven disk to move the driven disk between the column coupled position and the column decoupled position.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 2 is a schematic illustration of the steering column decoupling system in a coupled position; and FIG. 3 is a schematic illustration of the steering column decoupling system in a decoupled position.

DETAILED DESCRIPTION

Figure 1:
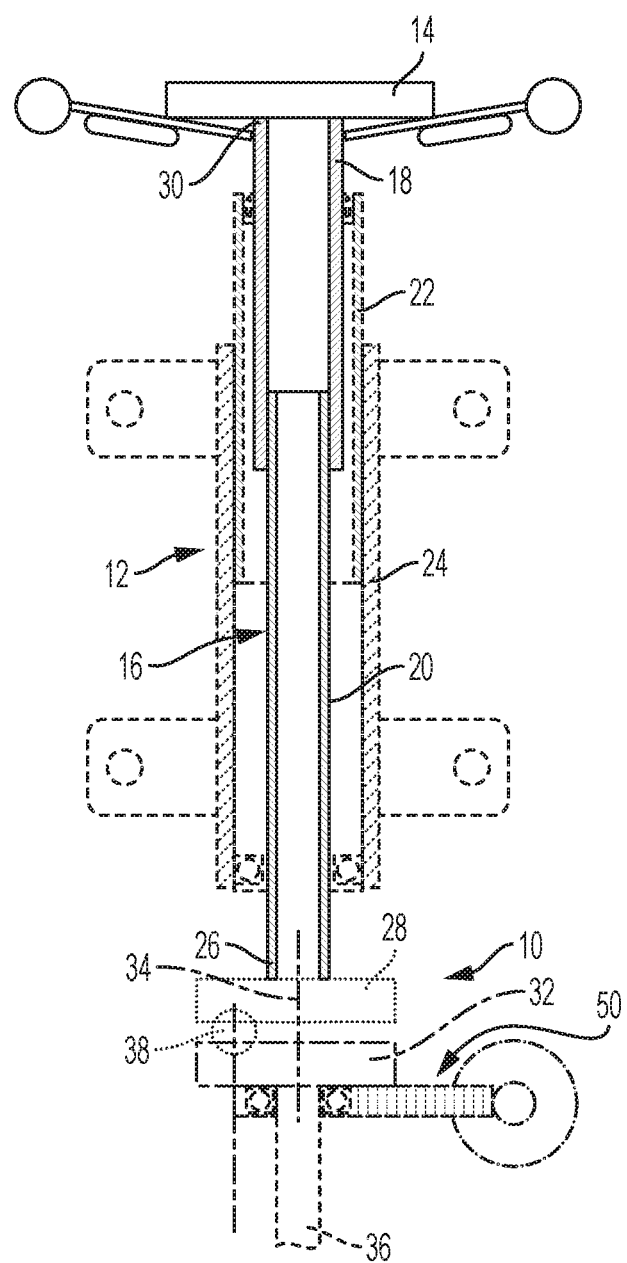
FIG. 1 is a cross-sectional view of a steering column decoupling system.

Referring now to the Figures, where the invention will be described with reference to specific embodiments, without limiting same, FIG. 1 depicts a steering column decoupling system 10 for a vehicle that benefits from selectively switching the condition of a steering column 12 between a coupled position and a decoupled position. For example, vehicles with steering systems that include steer-by-wire and/or autonomous driving features may benefit from the embodiments described herein.

A steer-by-wire system employs a control system and servos that interface with the vehicle such that the vehicle can be steered without mechanical linkage to a steering wheel 14, instead relying on electrical connections between the steering wheel 14 and a steering gear.

In some embodiments, the steering column decoupling system 10 may be part of an autonomous driving assisted steering (ADAS) system that is able to steer as well as control other parameters of the vehicle to operate it without direct driver involvement. Autonomous or semi-autonomous driving refers to vehicles that are configured to perform operations without continuous input from a driver (e.g., steering, accelerating, braking etc.) and may be equipped with technology that allows the vehicle to be autonomously or semi-autonomously controlled using sensing, steering, and/or braking technology.

In an autonomous system, the steering column may be retracted to a stowed position to provide a driver with more space. Additionally, it is desirable to place the steering wheel 14 in a non-rotatable condition to allow a driver to utilize the steering wheel 14 as a workspace, for example. Decoupling portions of the steering column 12 with the decoupling system 10 described herein advantageously facilitates the non-rotatable condition of the steering wheel 14.

The decoupling system 10 includes the steering wheel 14 that is operatively coupled to the steering column 12. In particular, the steering wheel 14 is operatively coupled to a steering shaft 16. In the illustrated embodiment, the steering shaft 16 comprises an upper steering shaft 18 and a lower steering shaft 20, but it is to be appreciated that the steering shaft 16 may be a single, unitary shaft or may include more than two segments. An upper jacket 22 and a lower jacket 24 are included and are coupled in a telescoping manner.

Rigidly connected to a first end 26 of the steering shaft 16 is a driving disk 28. The first end 26 of the steering shaft 16 is distal from a second end 30 of the steering shaft 16 that is operatively coupled to the steering wheel 14. The connection between the driving disk 28 and the steering shaft 16 results in corresponding rotation of the two elements. The driving disk 28 is operatively coupled to a driven disk 32 that is coupled to an end 34 of an intermediate shaft 36. The rigid connection between the driven disk 32 and the intermediate shaft 36 results in corresponding rotation of the two elements. The intermediate shaft 36 provides a mechanical coupling of the steering shaft 16, and hence the steering wheel 14, to a steering gear (not shown) that inputs rotational direction commands to road wheels of the vehicle through multiple intermediate components. As will be appreciated from the description herein, the coupling of the driving disk 28 and the driven disk 32 with a coupling element 38 facilitate desirable coupling and decoupling of the steering shaft 16 with the intermediate shaft 36.

Referring now to FIGS. 2 and 3, the steering column 12 is illustrated in a column coupled position (FIG. 2) and a column decoupled position (FIG. 3). As shown, the driving disk 28 and the driven disk 32 are coupled to each other with the coupling element 38 that is integrally formed with, or operatively coupled to, the driving disk 28. The coupling element 38 is a ball, pin, or the like that is sized to fit within a receiving element 40 defined by the driven disk 32. The receiving element 40 is a slot, recess, aperture or the like that extends from a first position 42 of the driven disk 32 radially outward to a second position 44. The slot 40 and coupling element 38 are oriented such that the steering wheel 14 is in the 12 o'clock, or straight ahead, steering position when the shafts are in the column decoupled position. This facilitates proper alignment of the ADAS associated devices that the steering wheel 14 may have.

Placement of the coupling element 38 in the first position 42 of the receiving feature 40 does not result in a transfer of rotation from the intermediate shaft 36 to the steering shaft 16, thereby providing the column decoupled position of the steering column 12 (FIG. 3). This is due to the coaxial alignment of a central axis 46 of the driven disk 32 and the center of the coupling element 38. Such alignment results in no torque being applied from the driving disk 32 to the driven disk 28, as the driven disk 32 simply rotates about the coupling element 38.

Placement of the coupling element 38 in the second position 44 of the receiving feature 40 results in a transfer of rotation from the intermediate shaft 36 to the steering shaft 16, thereby providing the column coupled position of the steering column (FIG. 2). This is due to the non-coaxial alignment of the central axis 46 of the driven disk 32 and the center of the coupling element 38. Such alignment results in torque being applied from the driven disk 32 to the driving disk. More specifically, a slot wall 48 that defines the receiving aperture 40 applies a torque to the driving disk 28 by biasing the coupling element 38 that it is in contact with.

Relative movement of the driving disk 28 and the driven disk 32 that facilitates switching back and forth between the column coupled position and the column decoupled position is controlled with an actuation mechanism 50. The actuation mechanism 50 is engageable with the driven disk 32 to shuttle the driven disk 32 along the coupling element 38. In particular, the actuation mechanism 50 imparts relative movement of the coupling element 38 within the receiving feature 40 of the driven disk 32. In some embodiments, the actuation mechanism 50 comprises a motor 52 that drives a worm actuator 54. The worm actuator 54 includes a worm drive 56 and a worm sector gear 58 that drives an engagement crank 60 that is pivotable to push the driven disk 32. The engagement crank 60 may be operatively coupled to the driven disk 32 or integrally formed therewith.

As described above, the decoupling system 10 is part of an autonomous driving system in some embodiments. In such embodiments, the driven disk 32 is in the column coupled position in a manual driving mode (which may also be referred to as a "live wheel" mode) and in the column decoupled position in an ADAS driving mode. Additionally, when in the ADAS enabled position, the ADAS can be deactivated and if the receiving feature 40 of the driven disk 32 is within 45 degrees, recoupling to the driving disk 28 and steering shaft 16 is possible so that the spokes on the steering wheel are properly oriented in a simultaneous manner.

Advantageously, automated transitioning between a mechanically coupled and decoupled steering column is provided by the embodiments described herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column decoupling system comprising:
a steering shaft;
an intermediate shaft;
a driving disk operatively coupled to the steering shaft and rotatable therewith;
a driven disk operatively coupled to the intermediate shaft and rotatable therewith, the driven disk disposed adjacent the driving disk;
a slot defined by the driven disk; and
a coupling element coupled to the driving disk and disposed within the slot, the driven disk moveable relative to the coupling element between a column coupled position and a column decoupled position, the slot extending from a first position radially outward to a second position, the first position disposing the coupling element in coaxial alignment with a central axis of the driven disk.

2. The system of claim 1, wherein the driving disk is rotationally locked in the column decoupled position, and the driving disk rotating in the column coupled position due to torque applied by a slot wall on the coupling element.

3. A steering column decoupling system comprising:
a steering shaft;
an intermediate shaft;
a driving disk operatively coupled to the steering shaft and rotatable therewith;
a driven disk operatively coupled to the intermediate shaft and rotatable therewith, the driven disk disposed adjacent the driving disk;
a slot defined by the driven disk; and
a coupling element coupled to the driving disk and disposed within the slot, the driven disk moveable relative to the coupling element between a column coupled position and a column decoupled position, the coupling element comprising a ball.

4. A steering column decoupling system comprising:
a steering shaft;
an intermediate shaft;

a driving disk operatively coupled to the steering shaft and rotatable therewith;
a driven disk operatively coupled to the intermediate shaft and rotatable therewith, the driven disk disposed adjacent the driving disk;
a slot defined by the driven disk; and
a coupling element coupled to the driving disk and disposed within the slot, the driven disk moveable relative to the coupling element between a column coupled position and a column decoupled position, the coupling element comprising a pin.

5. A steering column decoupling system comprising:
a steering shaft;
an intermediate shaft;
a driving disk operatively coupled to the steering shaft and rotatable therewith;
a driven disk operatively coupled to the intermediate shaft and rotatable therewith, the driven disk disposed adjacent the driving disk;
a slot defined by the driven disk;
a coupling element coupled to the driving disk and disposed within the slot, the driven disk moveable relative to the coupling element between a column coupled position and a column decoupled position; and
an actuation mechanism engageable with the driven disk, the actuation mechanism comprising a worm actuator driven by a motor.

6. The system of claim 5, wherein the actuation mechanism further comprises a pivotable engagement crank driven by the worm actuator.

7. A steering column decoupling system comprising:
a steering shaft;
an intermediate shaft;
a driving disk operatively coupled to the steering shaft and rotatable therewith;
a driven disk operatively coupled to the intermediate shaft and rotatable therewith, the driven disk disposed adjacent the driving disk;
a slot defined by the driven disk; and
a coupling element coupled to the driving disk and disposed within the slot, the driven disk moveable relative to the coupling element between a column coupled position and a column decoupled position, the steering column decoupling system being part of an advanced driving assist steering (ADAS) system that autonomously or semi-autonomously drives a vehicle.

8. The system of claim 7, wherein the driven disk is in the column coupled position in a non-ADAS driving mode, and the driven disk is in the column decoupled position in an ADAS driving mode.

9. A steering column decoupling system comprising:
a steering shaft;
an intermediate shaft;
a driving disk operatively coupled to the steering shaft and rotatable therewith;
a driven disk operatively coupled to the intermediate shaft and rotatable therewith;
a receiving element of the driven disk;
a coupling element coupled to the driving disk and disposed within the receiving element of the driven disk, the driving disk and the driven disk moveable relative to each other; and
an actuation mechanism engageable with the driven disk to move the driven disk between a column coupled position and a column decoupled position, the actuation mechanism comprising:
a motor;
a worm actuator driven by the motor; and
a pivotable engagement crank driven by the worm actuator.

10. The system of claim 9, wherein the receiving element comprises a slot defined by the driven disk and the coupling element is disposed within the slot.

11. The system of claim 10, wherein the slot extends from a first position radially outward to a second position, the first position disposing the coupling element in coaxial alignment with a central axis of the driven disk.

12. The system of claim 10, wherein the driving disk is rotationally locked in the column decoupled position, and the driving disk rotating in the column coupled position due to torque applied by a slot wall on the coupling element.

13. The system of claim 9, wherein the coupling element comprises a ball.

14. The system of claim 9, wherein the coupling element comprises a pin.

15. An advanced driving assist steering (ADAS) system comprising:
a steering shaft;
an intermediate shaft;
a driving disk operatively coupled to the steering shaft and rotatable therewith;
a driven disk operatively coupled to the intermediate shaft and rotatable therewith, the driven disk disposed adjacent the driving disk;
a slot defined by the driven disk;
a coupling element coupled to the driving disk and disposed within the slot, the driven disk moveable relative to the coupling element between a column coupled position and a column decoupled position, the driven disk is in the column coupled position in a non-ADAS driving mode, and the driven disk is in the column decoupled position in an ADAS driving mode; and
an actuation mechanism engageable with the driven disk to move the driven disk between the column coupled position and the column decoupled position.

16. The system of claim 15, wherein the slot extends from a first position radially outward to a second position, the first position disposing the coupling element in coaxial alignment with a central axis of the driven disk.

17. The system of claim 16, wherein the driving disk is rotationally locked in the column decoupled position, and the driving disk rotating in the column coupled position due to torque applied by a slot wall on the coupling element.

18. The system of claim 15, wherein the steering wheel is in a 12 o'clock position in the column decoupled position.

* * * * *